April 14, 1964            B. G. HOOD            3,129,270
METHOD OF MOLDING POLYURETHANE FOAM ARTICLES
HAVING IMPROVED SURFACE CHARACTERISTICS
Filed April 5, 1962            2 Sheets-Sheet 1
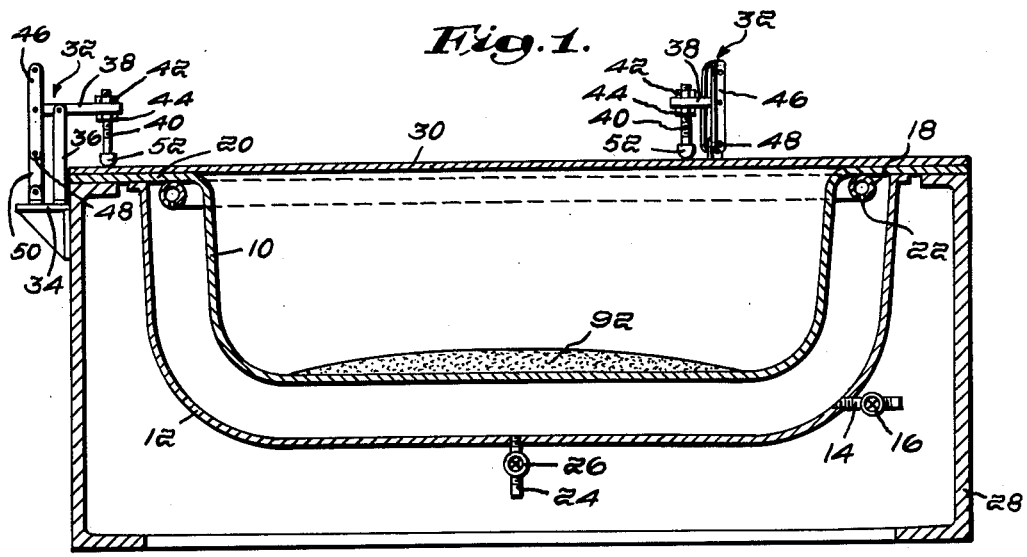
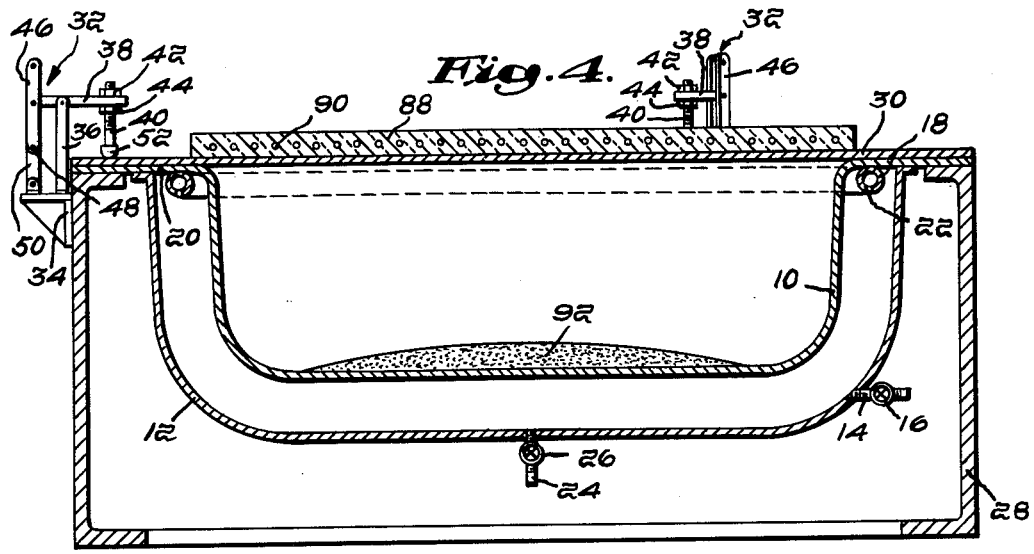
Inventor:
Bruce G. Hood,
by Kern E. Tobbers
Attorney

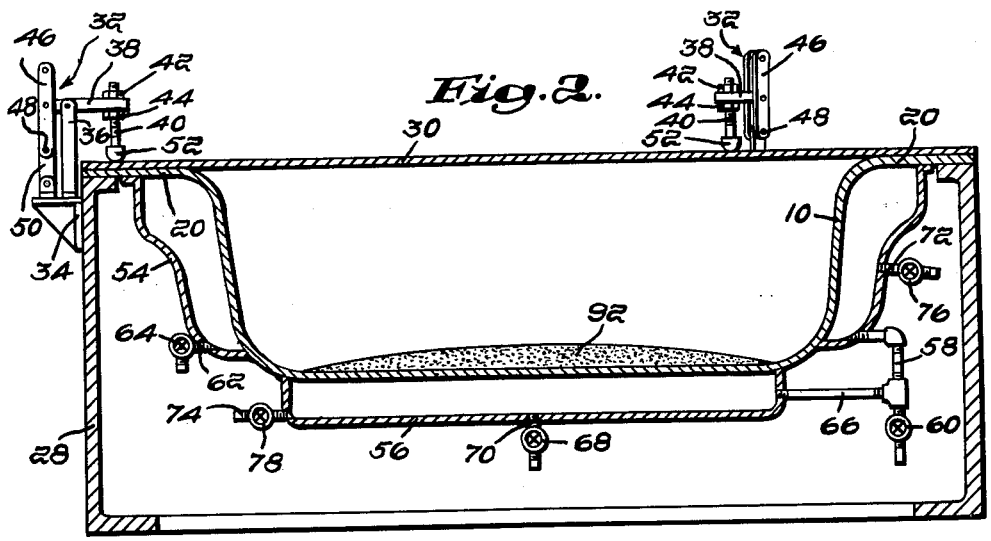
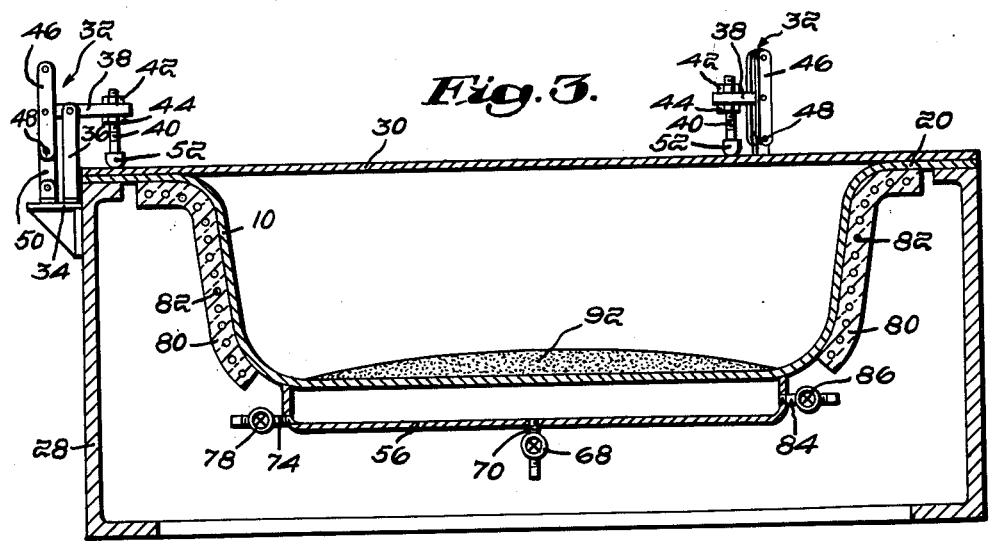

3,129,270
METHOD OF MOLDING POLYURETHANE FOAM ARTICLES HAVING IMPROVED SURFACE CHARACTERISTICS
Bruce G. Hood, Marblehead, Mass., assignor to Davidson Rubber Company, Inc., Dover, N.H., a corporation of New Hampshire
Filed Apr. 5, 1962, Ser. No. 185,306
4 Claims. (Cl. 264—54)

This invention related to improved methods of molding polyurethane foams.

The methods of the present invention are primarily concerned with the production of flexible polyether foams, and more specifically the so-called "one-shot" flexible polyether foams. The "one-shot" technique for preparing these foams involves the simultaneous mixing and reacting of a polyisocyanate, a polyether and water. While this method has the advantage of furnishing the highest possible exotherm, there are certain drawbacks to this procedure as at present carried out.

According to one of the commonly used methods the various materials are fed separately to a suitable mixing or foaming machine, after which the prefoam mixture is fed into the mold. The mold is then closed, and then immediately conveyed into a radiantly heated oven. Such procedures, however, produce excessive or uneven mold temperatures, which result in poor surface conditions on the molded product, such as loose skin or blow holes. On the other hand, when the mold temperatures are too low, foams with a tacky or non-curing surface or with excessively thick or loose skin are obtained.

It is a primary object of the present invention to overcome or avoid certain drawbacks and disadvantages of the prior art method such as that hereinbefore recited. In general the objects of the invention are obtained by first providing a liquid foam pour containing the various reactants, catalysts and other additives commonly used in the manufacture of polyurethane foams, immediately pouring the liquid mixture prior to foaming onto the bottom surface of a previously cooled mold, fastening a cover on the mold, allowing the mixture to foam and rise to the top of the mold, heating the upper portion of the mold to 200° to 212° F., then heating the lower portion of the mold to about the same temperature, and finally allowing the contents of the mold to cure.

The following is a typical formulation constituting, when mixed, a liquid pour which can be used in the preparation of the urethane foam by these methods, all the parts being by weight.

Component 1:
  Triol _____ 57
  Diol _____ 38
  Silicone oil_____ 2.0
  Triethylene diamine_____ 0.6
  Water _____ 3.7
Component 2:
  Stannous octoate_____ 0.2
  Triol _____ 3.0
  Diol _____ 2.0
Component 3: Tolylene diisocyanate_____ 48
Component 4: Trichloromonofluoromethane_____ 10

Triol is a trifunctional polypropylene glycol having a molecular weight of 3000.

Diol is a difunctional polypropylene glycol having a molecular weight of 2000.

The silicone oil used is a water soluble alkylsilane polyoxyalkylene copolymer, which is a foaming stabilizer, specifically the product made by the Union Carbide Corporation known as L-520.

The diisocyanate used is an 80:20 mixture of the 2,4 and 2,6 isomers of tolylene diisocyanate.

While the above formulation is a preferred one, it would be possible to use other similar mixtures of tolylene diisocyanate, a polyether, such as polyoxypropylene, and water, with a suitable catalyst and foam stabilizer added.

A suitable apparatus for accomplishing the purposes of this invention is shown in the accompanying drawings, in which like numerals represent like parts, and in which FIGURE 1 is a vertical cross section of a mold for molding and curing the foam, which is provided with means for alternately cooling and heating the side and bottom portions thereof.

FIGURE 2 is a cross sectional view of a similar mold, in which separate means are provided for cooling and heating the sidewalls and for cooling and heating the bottom portions of the mold.

FIGURE 3 represents a cross sectional view of a mold similar to that shown in FIGURE 2, but provided with electrical means for heating the sidewalls.

FIGURE 4 represents a cross sectional view of a mold similar to the mold shown in FIGURE 1, but also provided with electrical means for heating the top of the mold.

Referring more specifically to the drawings, FIGURE 1 shows a mold 10 provided with a jacket 12 completely surrounding the bottom and side portions thereof, to which water and steam are alternately supplied for cooling and heating purposes. Water at a predetermined temperature is supplied to jacket 12 through pipe 14, which is provided with a suitable rotary control valve 16. In the upper portion of jacket 12 is a pipe 18 to which steam is supplied from any suitable source and which completely encircles mold 10 and serves as a header for distributing steam to the jacket. Pipe 18 is welded or otherwise suitably fastened to the under side of the annular lip or flange 20 on mold 10, and is provided along its entire length with a series of perforations or distribution holes 22 in the bottom portion thereof. In the center of the bottom portion of jacket 12 a pipe 24 is provided having a control valve 26, which, when opened, permits the drainage or removal of water or steam.

Jacket 12 is welded or otherwise suitably fastened to the bottom of flange 20 of mold 10, which in turn is supported on the ring 28 or other suitable supporting element. Mold 10 is also provided with a flat, easily removable cover 30, which can be held firmly against the annular flange 20 by the toggle clamps 32, which are supported at spaced points on brackets 34 fastened on the outer periphery of ring 28. The toggle clamps 32 each consist of a stanchion 36 firmly fixed to a bracket 34 and a rocker arm 38 pivotally connected to the upper end of stanchion 36. A screw threaded bolt 40 is adjustably held at the inner end of each of the arms 38 and is locked in a predetermined position by means of the nuts 42 and 44. Pivotally connected centrally to the opposite end of each arm 38 is a handle member 46 consisting of parallel bars pinned together at each end. The bottom pin 48 on each handle member 46 provides a pivotal connection between member 46 and a link 50, which in turn is pivotally connected at its bottom end to bracket 34, member 46 and link 50 thereby forming a toggle joint. The bolts 40 on each toggle clamp 32 are provided at their bottom ends with rubber caps 52, and are held by arm 38 in such a position that when the toggle clamps are closed with cover 30 in place, caps 52 are pressed firmly against the top surface thereof.

The perforations 22 along the bottom of pipe 18 may be of the same size, but are preferably made of increasing diameter in direct proportion to their distance from the source of steam supply, whereby the quantity of steam conveyed to different portions of jacket 12 tends to be equalized.

In FIGURE 2 the mold 10 is provided with a jacket 54 for alternately heating and cooling the sidewalls and a jacket 56 for the similar treatment of the bottom of the mold. Water of the temperature required for cooling is supplied to jacket 54 by means of pipe 58 and control valve 60, and is drained therefrom through pipe 62 and control valve 64. Valve 60 also controls the supply of water to jacket 56 through pipe 66, while valve 68 controls the drainage of water from jacket 56 through pipe 70. Steam is supplied to jacket 54 through pipe 72, and to jacket 56 through pipe 74, the supply thereto being controlled respectively by valves 76 and 78. The steam is removed from jacket 54 through pipe 62, and from jacket 56 through pipe 70.

FIGURE 3 shows a molding apparatus similar to that of FIGURE 2, except that jacket 54 and the pipes for supplying and removing water and steam therefrom are replaced by an annular covering 80 of porcelain or other suitable insulating material, in which electric resistance wires 82 are embedded, which are used to control the heating of the sidewalls of mold 10. Water for cooling is supplied to jacket 56 through pipe 84 under the control of valve 86, while steam is supplied through pipe 74. Both the water and steam are removed from jacket 56 through pipe 70, as described in connection with FIGURE 2.

The apparatus of FIGURE 4 is similar to that of FIGURE 1, but in addition is provided with means for heating cover 30, which as shown includes a plate 88 of suitable insulating material, in which electric resistance wires 90 suitably connected to a source of electricity (not shown) are embedded.

In operation, after removing cover 30 the bottom and sidewalls of mold 10 are first brought to the desired temperature by supplying water at 100° to 130° F. to jacket 12 (FIGURE 1). When the mold walls have reached a temperature within the above range, which usually requires about 2 minutes, if the operation immediately follows the molding of a previous batch, the liquid foam 92 is poured manually, or by any suitable mechanical means, into the mold in an amount which usually substantially covers the bottom of the mold to a maximum depth at the center of about 1 to 2 inches, after which the cover 30 is immediately applied and held firmly in place by moving the toggle clamps 32 to the closed position shown in the drawings. After 30 to 60 seconds the ingredients of the foam have almost completely interacted, and the foam rises and completely fills the mold cavity. The water is then allowed to drain from the mold by opening valve 26, after which valve 26 is closed and steam at atmospheric pressure is supplied to pipe 18 and is thereby uniformly distributed to the upper part of jacket 12. The steam gradually seeps down into the lower portion of the jacket until the entire mold is heated to a temperature of 212° F., which usually requires between 1 and 2 minutes. After an additional 2 minutes, the clamps are opened, the cover is removed, and the molded piece or article, which is then fully cured, is removed.

Before proceeding with the next batch a coating of wax is applied to the mold surfaces, which facilitates the release of the molded article subsequently formed, and the steam is then permitted to escape from jacket 12. The process is then repeated by again supplying water at the proper temperature, that is between 100° and 130° F., but preferably at about 120° F., to the jacket and continuing as hereinbefore described. The entire process of making each molded article requires only about 6 to 8 minutes, so that if a battery of similar molds is employed, one or two operators can make a large quantity of molded pieces per hour owing to the relatively few and simple operations required.

The operation is carried out in a similar manner, when using the molds shown in FIGURES 2 and 3. When using the apparatus of FIGURE 2, water is supplied simultaneously to jackets 54 and 56 by opening valve 60. However, after pouring in the liquid foam, clamping on the cover, and draining the water, the steam is first supplied to jacket 54 by opening valve 76, and a minute or two later is supplied to jacket 56 by opening valve 78. Since the heat of reaction of the materials initially in the bottom of the mold tends to heat the bottom of the mold first, curing of the molded material takes place more evenly by applying external heat in this way, first at the top of the mold and later at the bottom.

When using the mold shown in FIGURE 3, water is first supplied to jacket 56 by opening valve 86. Then, after the foam is poured and the cover applied, heat sufficient to provide temperatures between 200° and 212° F. is first applied to the upper part of the mold by turning on the current to resistance wires 82, and then, after a minute or two and the water has been drained, steam is supplied to jacket 56 by opening valve 78. Thus, in each instance the heat is supplied to the walls of the mold in a direction counter current to the rising of the foam.

The operation of the mold shown in FIGURE 4 is essentially the same as that of the mold of FIGURE 1. However, in this instance the cover 30 is maintained at temperatures between 130° and 170° F., usually at about 150° F., by means of the electric resistance wires 90. If desired, the cover may be provided with a jacket and suitable flexible connections and heated with hot water at the above stated temperatures, but it is preferred to heat the cover electrically. Since the amount of heat applied to the cover is substantially the same throughout the process, the use of a heated cover does not require any additional manipulation and has the advantage of producing molded articles of the highest quality.

When using the formulations and processing conditions as hereinbefore described with reference to the various figures, the foam forms and rises in about 15 seconds. In view of this this cover 30 should be clamped on the mold right after the pour. The foam is then allowed to cook or cure, while containing the heating of the walls of the mold, which usually requires about 6 to 8 minutes.

The procedures herein outlined all involve a fast cycle and the use of simple, low cost equipment as compared with prior methods. Also, as a result of the proper timing of the application of heat to different portions of the foam, products of uniform quality and with optimum surface conditions are obtained.

What I claim is:

1. The method of molding polyurethane foams which comprises preparing a foam mixture in the liquid state, pouring said mixture prior to foaming into a mold in an amount sufficient to cover the bottom surface thereof, closing said mold, allowing said mixture to react and rise, thereby filling said mold with foam, and thereafter applying heat to said mold in order to cure said foam, said heat being applied first to the upper portion of said foam and then to the bottom portion thereof in a manner counter current to the rising foam, whereby a molded article of improved surface characteristics is obtained.

2. The method of molding polyurethane foams which comprises preparing a foam mixture in the liquid state, immediately pouring said mixture prior to foaming onto the bottom surface of a mold, clamping a cover on said mold, allowing said mixture to foam and rise to the top of the mold, thereafter heating the upper portion of the mold to 200° to 212° F., then heating the lower portion of the mold, and allowing the contents of the mold to cure.

3. The method of molding polyurethane foams which comprises bringing the walls of a mold to a temperature between 100° and 130° F., pouring a liquid polyurethane-forming mixture into the mold in a quantity sufficient to substantially cover the bottom thereof, fastening a cover on said mold, allowing said mixture to foam and rise to the top of the mold, thereafter heating the upper portion of the mold to a temperature between about 200° and 212° F., continuing the heating of the mold until the entire mold has reached 200° to 212° F., and then allowing the contents of the mold to cure while maintaining said temperatures.

4. The method of molding polyurethane foams which comprises maintaining the walls of a mold at temperatures between 100° and 130° F., pouring a liquid polyurethane-forming mixture into the mold in a quantity sufficient to fill the mold after completion of the reaction, immediately fastening a cover on said mold, allowing said mixture to foam and rise to the top of the mold, thereafter heating the upper portion of the mold to a temperature between about 200° and 212° F., then heating the lower portion of the mold to a temperature between 200° and 212° F. while continuing to heat the upper portion of the mold, and allowing the contents of the mold to cure for a few minutes while maintaining said temperatures.

References Cited in the file of this patent

UNITED STATES PATENTS

| | | |
|---|---|---|
| 1,812,282 | Blaker | June 30, 1931 |
| 2,187,918 | Sloan | Jan. 23, 1940 |
| 2,306,107 | Henderson | Dec. 22, 1942 |
| 2,752,635 | Miller | July 3, 1956 |
| 2,767,433 | De Caussemaker | Oct. 23, 1956 |
| 2,887,722 | Bauers | May 26, 1959 |
| 2,951,260 | Harrison et al. | Sept. 6, 1960 |
| 3,012,284 | Touhey | Dec. 12, 1961 |
| 3,056,168 | Terry | Oct. 2, 1962 |

OTHER REFERENCES

Mobay Technical Information Bulletin, "Molded One-Shot Polyether Topper Pads," T1B No. 34–F11, November 25, 1959, all pages. Copy in Div. 50.

Du Pont Foam Bulletin, "Trouble-Shooting Guide for Molding One-Shot Resilient Polyether Foam," November 30, 1960. All pages. Copy in Div. 50 and 18–48S.